(12) United States Patent
Chen et al.

(10) Patent No.: US 10,621,905 B2
(45) Date of Patent: Apr. 14, 2020

(54) OPERATIONAL AMPLIFIER, LOAD DRIVING APPARATUS AND GRAYSCALE VOLTAGE GENERATING CIRCUIT

(71) Applicant: Novatek Microelectronics Corp., Hsinchu (TW)

(72) Inventors: Ji-Ting Chen, Hsinchu County (TW); Wei-Hsiang Hung, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/706,776

(22) Filed: Sep. 18, 2017

(65) Prior Publication Data

US 2018/0005554 A1    Jan. 4, 2018

Related U.S. Application Data

(63) Continuation of application No. 13/781,777, filed on Mar. 1, 2013, now Pat. No. 9,792,843.

(30) Foreign Application Priority Data

Sep. 19, 2012 (TW) .............................. 101134312 A (51) Int. Cl.
   *G09G 3/20* (2006.01)
   *H02J 4/00* (2006.01)
   *H04N 5/14* (2006.01)

(52) U.S. Cl.
   CPC .............. *G09G 3/2096* (2013.01); *H02J 4/00* (2013.01); *H04N 5/148* (2013.01); *G09G 2310/027* (2013.01); *G09G 2310/0291* (2013.01); *G09G 2320/0276* (2013.01); *Y10T 307/461* (2015.04)

(58) Field of Classification Search
   CPC ............................................. G09G 2310/0291
   See application file for complete search history.

(56) References Cited

U.S. PATENT DOCUMENTS

| | | | | |
|---|---|---|---|---|
| 7,463,231 B2 * | 12/2008 | Miura | ................ | G09G 3/3696 330/148 |
| 9,299,310 B2 * | 3/2016 | Hong | ................ | G09G 5/00 |
| 9,792,843 B2 * | 10/2017 | Chen | ................ | G09G 3/00 |
| 9,997,119 B2 * | 6/2018 | Lin | ................ | G09G 3/3614 |
| 2006/0050036 A1 * | 3/2006 | Miura | ................ | G09G 3/3696 345/89 |
| 2009/0040165 A1 * | 2/2009 | Shimatani | ................ | G09G 3/3688 345/98 |
| 2009/0244056 A1 * | 10/2009 | Tsuchi | ................ | G09G 3/3688 345/214 |

(Continued)

*Primary Examiner* — Patrick F Marinelli
(74) *Attorney, Agent, or Firm* — JCIPRNET (57) ABSTRACT

An operational amplifier applicable to a display device is provided. The operational amplifier having multiple output stages. The operational amplifier includes an input stage, an output stage selection module and a plurality of output stages. The output stage selection module is coupled to the input stage. Each of the output stages is coupled to the output stage selection module and is coupleable to drive a corresponding one of a plurality of loads. The output stage selection module is configured to selectively couple or discouple each of the output stages respectively to the input stage according to a plurality of selection signal. Furthermore, a load driving apparatus and a grayscale voltage generating circuit are also provided.

32 Claims, 3 Drawing Sheets

(56) References Cited

U.S. PATENT DOCUMENTS

| | | | |
|---|---|---|---|
| 2010/0295874 A1* | 11/2010 | Liu | G09G 3/3696 345/690 |
| 2011/0157150 A1* | 6/2011 | Wu | H03F 3/45475 345/214 |
| 2012/0206424 A1* | 8/2012 | Chen | G09G 3/006 345/204 |
| 2012/0286871 A1* | 11/2012 | Ohnuki | H03F 1/0277 330/261 |
| 2014/0062986 A1* | 3/2014 | Huang | G09G 3/3696 345/212 |
| 2014/0078129 A1* | 3/2014 | Hong | G09G 5/00 345/212 |
| 2014/0078189 A1* | 3/2014 | Chen | G09G 3/00 345/690 |
| 2018/0005554 A1* | 1/2018 | Chen | G09G 3/00 |

* cited by examiner

OPERATIONAL AMPLIFIER, LOAD DRIVING APPARATUS AND GRAYSCALE VOLTAGE GENERATING CIRCUIT

CROSS-REFERENCE TO RELATED APPLICATION

This application is a continuation application of and claims the priority benefit of a prior application Ser. No. 13/781,777, filed on Mar. 1, 2013, now allowed. The prior application Ser. No. 13/781,777 claims the priority benefit of Taiwan application serial no. 101134312, filed on Sep. 19, 2012. The entirety of each of the above-mentioned patent applications is hereby incorporated by reference herein and made a part of this specification.

TECHNICAL FIELD

The disclosure relates to a driving apparatus and voltage generating circuit, and particularly relates to a load driving apparatus and a grayscale voltage generating circuit using the same.

BACKGROUND

Figure 1:
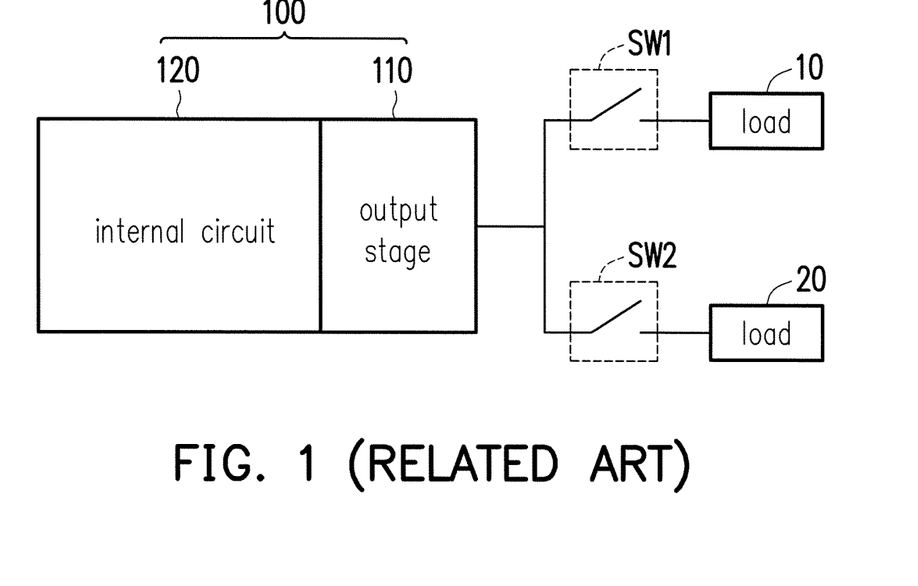
FIG. 1 is a schematic diagram illustrating a conventional operational amplifier for driving a plurality of loads.

To drive a plurality of loads, the conventional load driving apparatus is usually configured with a switch or a multiplexer between the output terminal of the load driving apparatus and the loads to select the load to be driven. Taking an operational amplifier as an example, FIG. 1 is a schematic diagram illustrating a conventional operational amplifier for driving a plurality of loads. Referring to FIG. 1, an operational amplifier includes a single output stage 110 and an internal circuit 120 excluding the output stage 110. A driving ability of a driving signal provided by the internal circuit 120 is enhanced by the output stage 110 and then output to the load to be driven. The output stage 110 is capable of outputting a current to a back-end load for supplying current or voltage. Therefore, to select the load to be driven, switches SW1 and SW2 are respectively configured to connect between loads 10 and 20 and the output stage 110 in FIG. 1. The switches SW1 and SW2 allow the driving signal to select one of the paths to drive the load 10 or 20.

However, since the switches SW1 and SW2 are equivalent to equivalent resistors configured on the driving path when the switches SW1 and SW2 are conducted, the driving ability of the driving signal is reduced before the driving signal is transmitted to the back-end load due to the equivalent resistor. In addition, due to configuration of the switches SW1 and SW2, the driving signal may not drive the load 10 or load 20 with a precise voltage value.

SUMMARY

The disclosure provides a load driving apparatus having a plurality of output stages and capable of driving a plurality of loads.

The disclosure provides a grayscale voltage generating circuit that includes a plurality of the load driving apparatus and provides the grayscale voltage precisely.

The disclosure provides an operational amplifier applicable to a display device. The operational amplifier having multiple output stages. The operational amplifier includes an input stage, an output stage selection module and a plurality of output stages. The output stage selection module is coupled to the input stage. Each of the output stages is coupled to the output stage selection module and is coupleable to drive a corresponding one of a plurality of loads. The output stage selection module is configured to selectively couple or discouple each of the output stages respectively to the input stage according to a plurality of selection signals.

In an embodiment of the disclosure, different output stages are configured to drive different corresponding loads under control of the output stage selection module.

In an embodiment of the disclosure, the output stage selection module couples at least one of the output stages to the input stage, such that the at least one output stage coupled to the input stage is capable of driving the corresponding at least one load.

In an embodiment of the disclosure, when the output stage selection module selectively couples the at least one of the output stages to the input stage, the output stage selection module selectively discouples the other at least one of the output stages with the input stage according to the plurality of selection signals.

In an embodiment of the disclosure, the operational amplifier further includes a gain stage. The gain stage is coupled between the input stage and the output stage selection module.

In an embodiment of the disclosure, the output stage selection module includes a plurality of selection units. The plurality of selection units is each coupled between the input stage and a corresponding one of the output stages.

In an embodiment of the disclosure, each of the selection units is conducted or disconducted according to at least one of the selection signals.

In an embodiment of the disclosure, at least one of the output stages is in a push-pull configuration.

In an embodiment of the disclosure at least one of the output stages is in a common source configuration.

In an embodiment of the disclosure, at least one of the output stages is in a common drain configuration.

The disclosure provides an operational amplifier applicable to a display device. The operational amplifier having multiple output stages. The operational amplifier includes an input stage, an output stage selection module and a plurality of output stages. The output stage selection module includes a plurality of signal transmitting paths. The plurality of output stages is each coupleable to drive a corresponding one of a plurality of loads. Each of the signal transmitting paths is coupled between the input stage and a corresponding one of the output stages. Each of the signal transmitting paths is selectively conducted to couple the corresponding output stage to the input stage or disconducted to discouple the corresponding output stage with the input stage.

In an embodiment of the disclosure, different output stages are configured to drive different corresponding loads under control of the output stage selection module.

In an embodiment of the disclosure, at least one of the signal transmitting paths is conducted to have the at least one corresponding output stage coupled to the input stage and capable of driving the corresponding at least one load.

In an embodiment of the disclosure, when the at least one signal transmitting paths is conducted, the other at least one of the signal transmitting paths is disconducted to discouple the other at least one of the output stages with the input stage.

The disclosure provides a load driving apparatus applicable to a display device. The load driving apparatus having multiple output stages. The load driving apparatus includes a load driving module, an output stage selection module and a plurality of output stages. A load driving module is configured to provide a driving signal at least one node. The output stage selection module is coupled to the load driving module to receive the driving signal. Each of the output stages is coupled to the output stage selection module and is coupleable to drive a corresponding one of a plurality of loads. The output stage selection module is configured to selectively couple or discouple each of the output stages to the at least one node of the load driving module according to a plurality of selection signals.

In an embodiment of the disclosure, different output stages are configured to drive different corresponding loads under control of the output stage selection module.

In an embodiment of the disclosure, the output stage module couples at least one of the output stages to the at least one node of the load driving module such that the at least one output stage coupled to the at least one node of the load driving module is capable of driving the corresponding at least one load according to the driving signal.

In an embodiment of the disclosure, when the output stage module couples at least one of the output stages to the at least one node of the load driving module, the output stage module discouples the other at least one of the output stages with the at least one node of the load driving module.

In an embodiment of the disclosure, the load driving module includes one or more stages coupled in series. The one or more stages is configured to receive an input signal and generate the driving signal based on the input signal.

In an embodiment of the disclosure, the output stage selection module includes a plurality of selection units. The plurality of selection units are each coupled between the at least one node of the load driving module and a corresponding one of the output stages.

In an embodiment of the disclosure, each of the selection units is conducted or disconducted according to at least one of the selection signals.

In an embodiment of the disclosure, at least one of the output stages is in a push-pull configuration.

In an embodiment of the disclosure, at least one of the output stages is in a common source configuration.

In an embodiment of the disclosure, at least one of the output stages is in a common drain configuration.

The disclosure provides a load driving apparatus applicable to a display device. The load driving apparatus having multiple output stages. The load driving apparatus includes a load driving module, an output stage selection module and a plurality of output stages. The load driving module is configured to provide a driving signal at least one node. The output stage selection module includes a plurality of signal transmitting paths. The plurality of output stages are each coupleable to drive a corresponding one of a plurality of loads. Each of the signal transmitting paths is coupled between the at least one node of the load driving module and a corresponding one of the output stages. Each of the signal transmitting paths is selectively conducted to couple the corresponding output stage to the at least one node of the load driving module or disconducted to discouple the corresponding output stage with the at least one node of the load driving module.

In an embodiment of the disclosure, different output stages are configured to drive different corresponding loads under control of the output stage selection module.

In an embodiment of the disclosure, the output stage module couples at least one of the output stages to the at least one node of the load driving module such that the at least one output stage coupled to the at least one node of the load driving module is capable of driving the corresponding at least one load according to the driving signal.

In an embodiment of the disclosure, when the output stage module couples at least one of the output stages to the at least one node of the load driving module, the output stage module discouples the other at least one of the output stages with the at least one node of the load driving module.

The disclosure provides a grayscale voltage generating circuit. The grayscale voltage generating circuit includes a load driving module, a plurality of gamma resistor strings and a plurality of load driving apparatuses. The load driving module is configured to provide a driving signal at least one node. The plurality of gamma resistor strings are each for generating a plurality of grayscale voltages according to a plurality of driving signals. The plurality of load driving apparatuses are each as the above load driving apparatus and are each coupled to all of the gamma resistor strings, wherein each of the output stages of each of the load driving apparatuses are coupled to a corresponding one of the gamma resistor strings.

In an embodiment of the disclosure, one of the output stages of each of the load driving apparatuses is coupled to the at least one node of the load driving module of the load driving apparatuses, and the other at least one of the output stages of each of the load driving apparatuses is not coupled to the at least one node of the load driving module of the load driving apparatuses, such that one of gamma resistor strings coupled to the one output stage of each of the load driving apparatuses is configured to generate the grayscale voltages.

The disclosure provides a grayscale voltage generating circuit. The grayscale voltage generating circuit includes a load driving module, a plurality of gamma resistor strings and a plurality of load driving apparatuses. The load driving module is configured to provide a driving signal at least one node. The plurality of gamma resistor strings are each for generating a plurality of grayscale voltages according to a plurality of driving signals. The plurality of load driving apparatuses are each as the above load driving apparatus and are each coupled to all of the gamma resistor strings. Each of the output stages of each of the load driving apparatuses are coupled to a corresponding one of the gamma resistor strings.

In an embodiment of the disclosure, one of the output stages of each of the load driving apparatuses is coupled to the at least one node of the load driving module of the load driving apparatuses, and the other at least one of the output stages of each of the load driving apparatuses is not coupled to the at least one node of the load driving module of the load driving apparatuses, such that one of gamma resistor strings coupled to the one output stage of each of the load driving apparatuses is configured to generate the grayscale voltages.

In view of the above, in the exemplary embodiments of the disclosure, the load driving apparatus has a plurality of output stages which are used with the output stage selection module. The load driving apparatus outputs the driving signal to the corresponding load according to the selection signal and drives the corresponding load.

To make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 2:
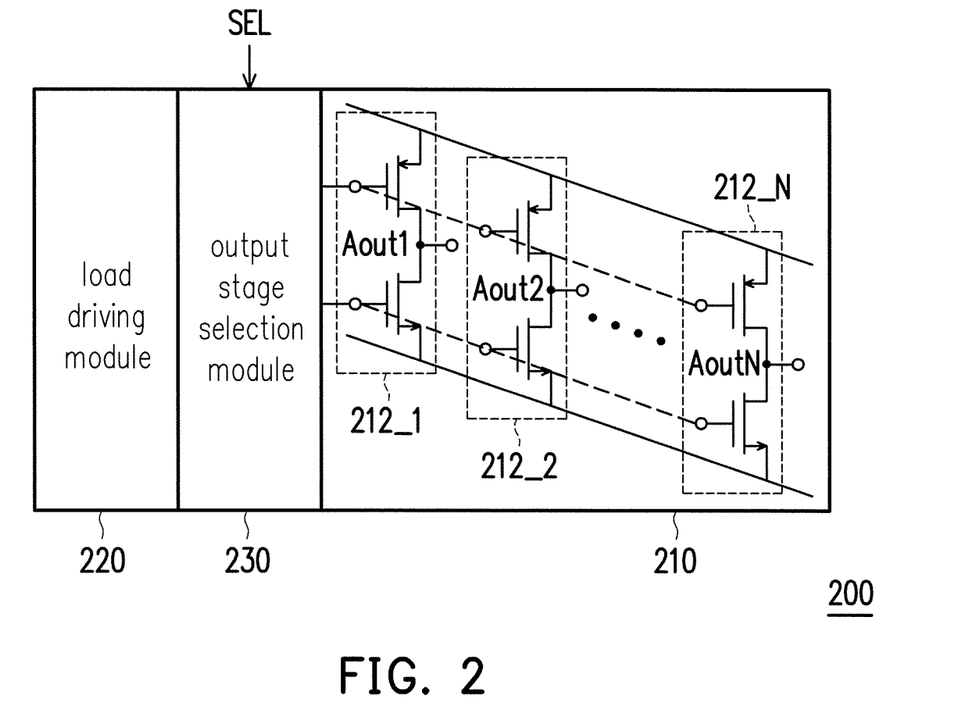
FIG. 2 is a schematic diagram illustrating a load driving apparatus according to an embodiment of the disclosure.

FIG. 2 is a schematic diagram illustrating a load driving apparatus according to an embodiment of the disclosure. Referring to FIG. 2, a load driving apparatus 200 of this embodiment is adapted for driving a plurality of loads (not shown). The load driving apparatus 200 includes an output stage module 210, a load driving module 220, and an output stage selection module 230. In this embodiment, the output stage module 210 includes a plurality of output stages from 212_1, 212_2, to 212_N. Each of the output stages is coupled to a corresponding one of the loads (not shown) through an output terminal of each of the output stages. For example, the output stage 212_1 is coupled to the load driven by the output stage 212_1 through an output terminal Aout1 of the output stage 212_1, and the output stage 212_2 is coupled to the load driven by the output stage 212_2 through an output terminal Aout2 of the output stage 212_2. The coupling relation between rest of the output stages and loads may be analogically inferred following the above. A function of each of the output stages is, for example, to increase a driving ability of a driving signal output by the each of the output stages. In addition, in this embodiment, the output stages 212_1, 212_2, to 212_N are exemplified with a push-pull output stage, for example. However, the disclosure does not impose any limitation on a type of each of the output stages. In other embodiments, each of the output stages may be an output stage in a common source or common drain configuration.

In this embodiment, the load driving module 220 is coupled to the output stage module 210 through the output stage selection module 230 and provides a driving signal to the output stage module 210, so as to drive one of the loads coupled to the output stage 210. In this embodiment, the output stage selection module 230 is coupled between the output stage module 210 and the load driving module 220. The output stage selection module 230 selects one of the output stages in the output stage module 210 according to a selection signal SEL, such that the load driving module 220 drives one of the loads coupled to the load driving module 220 through the selected output stages. For example, the output stage selection module 230 selects to conduct a signal transmitting path in the output stage selection module 230 according to the selection signal SEL. Through the signal transmitting path, the driving signal is transmitted to the output stage 212_2, such that the load driving module 220 drives and output the load coupled to the output stage 212_2 through the output stage 212_2.

Therefore, the load driving apparatus 200 of this embodiment has multiple output stages and is used with the output stage selection module 230. The load driving apparatus 200 selects to output the driving signal to the corresponding load and drive the corresponding load according to the selection signal SEL. Consequently, in this embodiment, the signal transmitting path between the output stage module 210 and each of the loads is unnecessary to be configured with a switch or any kind of selection unit. With such configuration, the problem that a signal driving ability is reduced due to configuration of a switch or selection unit is avoided.

Figure 3:
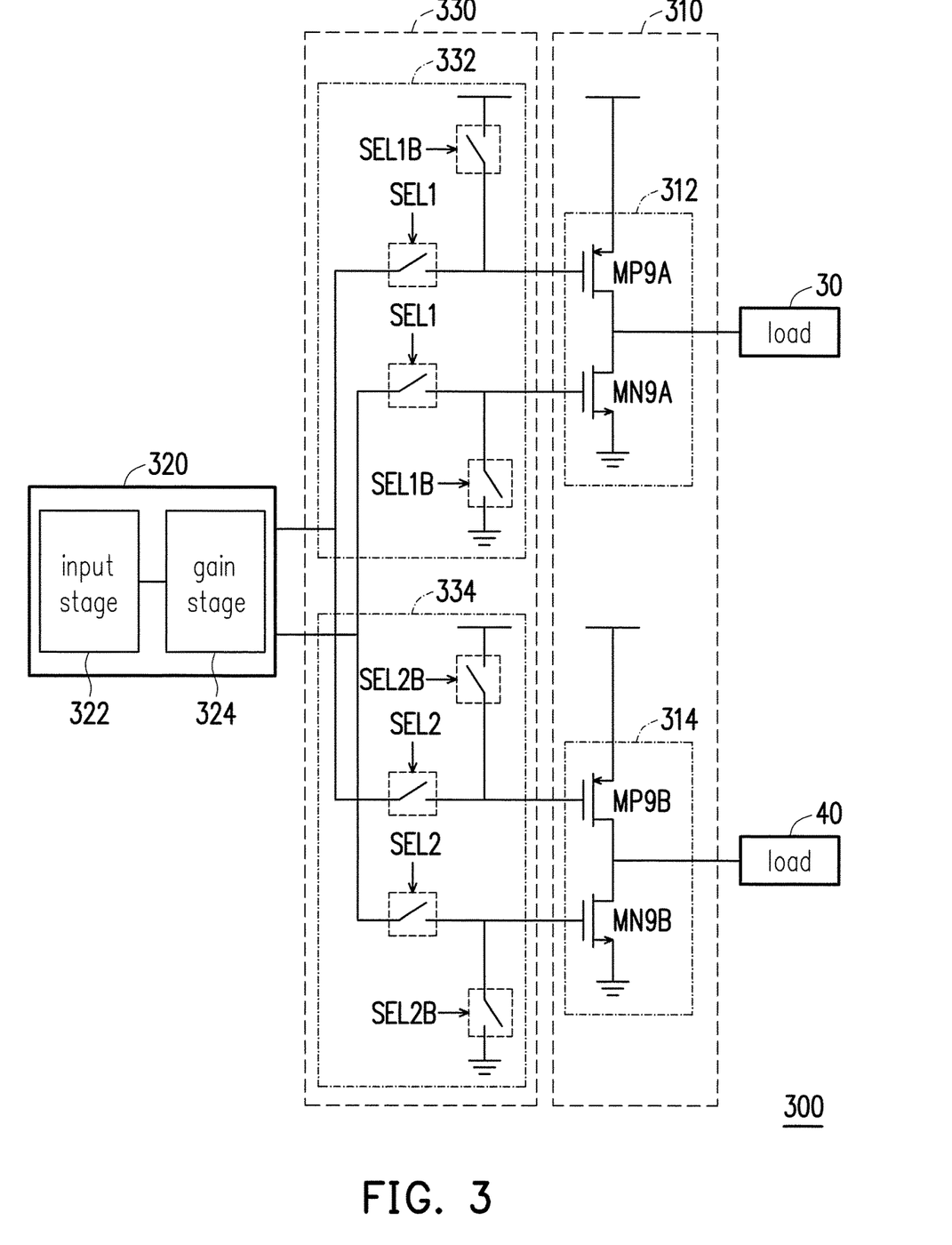
FIG. 3 is a schematic diagram illustrating a load driving apparatus according to another embodiment of the disclosure.

FIG. 3 is a schematic diagram illustrating a load driving apparatus according to another embodiment of the disclosure. Referring to FIG. 3, this embodiment further discloses an embodiment of a circuit in an output stage selection module. However, the embodiment only serves as an exemplary description, and the disclosure is not limited thereto. For a concise description, an output stage module 310 of this embodiment is exemplified with double output stages. However, the disclosure does not limit on the number of output stages.

In this embodiment, the output stage module 310 includes output stages 312 and 314 respectively configured to drive loads 30 and 40. According to the number of output stages, an output stage selection module 330 includes two selection units 332 and 334. The selection unit 332 is coupled between the output stage 312 and the load driving module 320, whereas the selection unit 334 is coupled between the output stage 314 and the load driving module 320. In other embodiments, the output stage selection module 330 may include more than two selection units. In this embodiment, a selection signal includes selection signals SEL1 and SEL2, and based on the selection signal, each of the selection units determines whether to conduct or not, such that the load driving module 320 drives one of the loads through a conducted selection unit and the output stage coupled to the conducted selection unit.

For example, during a driving period, a load driving apparatus 300 drives the load 30, for example. At this time, the selection signal SEL1 conducts a switch coupled between a gate of a transistor MP9A and the load driving module 320 and a switch coupled between a gate of a transistor MN9A and the load driving module 320, so as to provide the driving signal with a transmitting path for transmission to the output stage 312, thereby driving the load 30. In addition, a selection signal SEL1B and the selection signal SEL1 are mutually inverse, so a switch coupled between the gate of the transistor MP9A and a system voltage and a switch coupled between the gate of the transistor MN9A and a ground voltage are turned off, so as to avoid the system voltage turning off the transistor MP9A and the ground voltage turning off the transistor MN9A. During the driving period, the selection unit 334 operates oppositely to the selection unit 332. Namely, the selection signal SEL2 turns off a switch coupled between a gate of a transistor MP9B and the load driving module 320 and a switch coupled between a gate of a transistor MN9B and the load driving module 320, so as to switch off a transmitting path of the driving signal and prevent the driving signal from being output from the output stage 314. A selection signal SEL2B and the selection signal SEL2 are mutually inverse, so a switch coupled between the gate of the transistor MP9B and the system voltage and the switch coupled between the gate of the transistor MN9B and the ground voltage are turned on, such that the system voltage turns off the transistor MP9B and the ground voltage turns off the transistor MN9B. Therefore, when one of the selection units 332 and 334 is conducted, the other of the selection units 332 and 334 is not conducted. The concept is applicable to an output stage selection module with more than two selection units, and an embodying configuration is, for example, that when one of the selection units is conducted, the rest of the selection units are not conducted.

Then, the load driving apparatus 300 drives the load 40 in another driving period, for example. Now, the selection unit 334 operates in the same way as operation of the selection unit 332 in the driving period described above, whereas the selection unit 332 operates in the same way as operation of the selection unit 334 in the driving period described above, so no further detail is reiterated hereinafter.

It should be noted that numbers of the selection unit, selection signal, and output stage of this embodiment are not related to each other. The numbers of the selection unit, selection signal, and output stage may be adjusted based on practical requirement, and the disclosure is not limited thereto.

In addition, if the load driving apparatus 300 in this embodiment is an operational amplifier having double output stages, the load driving module 320 further includes an input stage 322 and a gain stage 324. The input stage 322 is configured to receive an input signal and generate an internal signal based on the input signal. The gain stage 324 is coupled to the input stage 322 to receive the internal signal and generate the driving signal to the output stage selection module 330 based on the internal signal.

Figure 4:
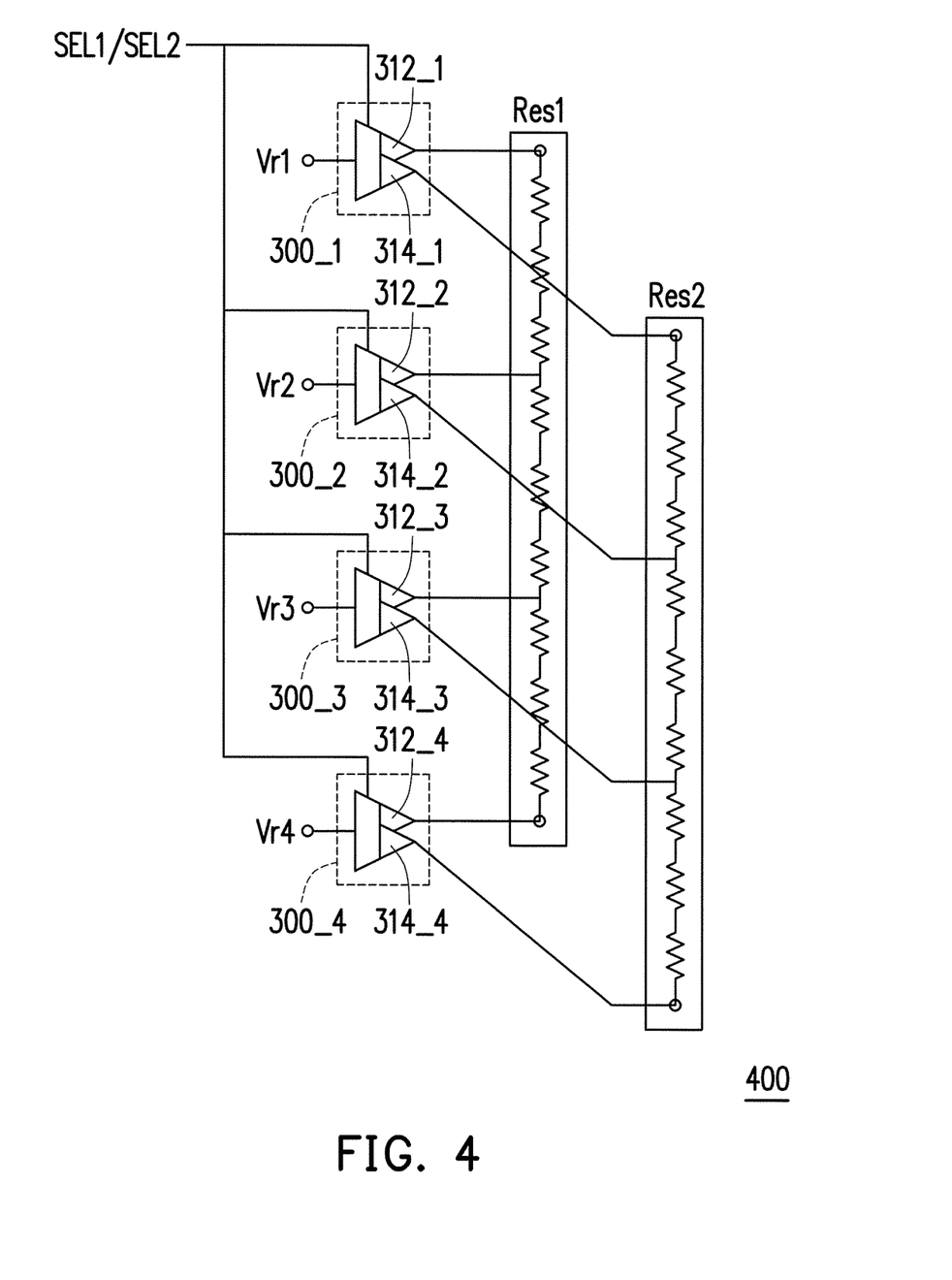
FIG. 4 is a schematic diagram illustrating a grayscale voltage generating circuit according to an embodiment of the disclosure.

FIG. 4 is a schematic diagram illustrating a grayscale voltage generating circuit according to an embodiment of the disclosure. Referring to FIG. 5, a grayscale voltage generating circuit 400 of this embodiment includes a plurality of gamma resistor strings Res1 and Res2 in addition to a plurality of loading driving apparatus (as shown in FIGS. 3) 300_1 to 300_4. It should be noted that the load driving apparatus of this embodiment is not limited to a circuit structure disclosed in FIG. 3, wherein each of the load driving apparatus is, for example, an operational amplifier having double output stages.

Specifically, in this embodiment, the gamma resistor string Res1 is coupled to output stages 312_1 to 312_4 of the load driving apparatus 300_1 to 300_4, and the gamma resistor string Res2 is coupled to output stages 314_1 to 314_4 of the load driving apparatus 300_1 to 300_4. The gamma resistor strings Res1 and Res2 respectively generate a plurality of grayscale voltages according to the driving signal provided by the load driving apparatus 300_1 to 300_4. In this embodiment, the load driving apparatus 300_1 to 300_4 are configured to receive different gamma voltages Vr1 to Vr4 and generate the driving signal based on the gamma voltages Vr1 to Vr4. In addition, the load driving apparatus 300_1 to 3004 select to output the driving signal to one of the gamma resistor strings Res1 and Res2 according to the selection signals SEL1 or SEL2, such that the gamma resistor Res1 or Res2 generates the grayscale voltages.

For example, when the selection signal SEL1 is enabled, the load driving apparatus 300_1 to 300_4 select the respectively corresponding output stages 312_1 to 312_4 to output the driving signal, so as to drive the gamma resistor string Res1 to generate the grayscale voltages according to the gamma voltages Vr1 to Vr4. Similarly, when the selection signal SEL2 is enabled, the load driving apparatus 300_1 to 300_4 select the respectively corresponding output stages 314_1 to 314_4 to output the driving signal, so as to drive the gamma resistor string Res2 to generate the grayscale voltages according to the gamma voltages Vr1 to Vr4.

Generally speaking, in an application of a driving apparatus for a display, a gamma voltage usually needs to be precisely controlled to prevent a grayscale voltage generated by a gamma resistor string from being deviated from a preset voltage value. Therefore, by using the load driving apparatus disclosed in the exemplary embodiments of the disclosure, there is no need to configure any switch or any kind of selection unit between the output stage and load of the load driving apparatus. When the load driving apparatus is used in the grayscale voltage generating circuit, the problem that the grayscale voltage is deviated due to configuration of the switch or selection unit may be avoided.

In view of the above, in the exemplary embodiments of the disclosure, the load driving apparatus has a plurality of output stage modules. When used with the output stage selection module, the load driving apparatus outputs the driving signal to the corresponding load according to the selection signal and drives the corresponding load. When used in the grayscale voltage generating circuit, the problem that the grayscale voltage is deviated due to the additional configuration of a switch or selection unit is avoided.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claim is:

1. An operational amplifier applicable to a grayscale voltage generating circuit in a display device, the operational amplifier having multiple output stages, the operational amplifier comprising:
   an input stage;
   an output stage selection module, coupled to the input stage; and
   a first output stage and a second output stage, wherein the first output stage is coupled to the output stage selection module and is configured to be coupled to drive a first load, and the second output stage is coupled to the output stage selection module and is configured to be coupled to drive a second load,
   wherein the output stage selection module is configured to couple one of the output stages to the input stage and decouple the rest of the output stages with the input stage according to a plurality of selection signals, such that the same input stage is configured to be coupled to a different one of the output stages and only one of the loads is driven,
   wherein the first load is a first gamma resistor string and the second load is a second gamma resistor string, each of the plurality of gamma resistor strings is configured to be driven by the respective output stage so as to generate a respective grayscale voltage.

2. The operational amplifier as claimed in claim 1, wherein different output stages are configured to drive different corresponding loads under control of the output stage selection module.

3. The operational amplifier as claimed in claim 1, wherein the one of output stages coupled to the input stage is capable of driving the corresponding one of the loads.

4. The operational amplifier as claimed in claim 1, further comprising:
   a gain stage, coupled between the input stage and the output stage selection module.

5. The operational amplifier as claimed in claim 1, wherein the output stage selection module comprises:
   a plurality of selection units, each coupled between the input stage and a corresponding one of the output stages.

6. The operational amplifier as claimed in claim 1, wherein each of a plurality of selection units is conducted or disconducted according to at least one of the selection signals.

7. The operational amplifier as claimed in claim 1, wherein at least one of the output stages is in a push-pull configuration.

8. The operational amplifier as claimed in claim 1, wherein at least one of the output stages is in a common source configuration.

9. The operational amplifier as claimed in claim 1, wherein at least one of the output stages is in a common drain configuration.

10. The operational amplifier as claimed in claim 1, wherein when one of the signal transmitting paths is conducted to couple the one of the output stages to the input stage, the one of the output stages provides a driving signal to one of the gamma resistor strings, such that the one of the gamma resistor strings generates a plurality of grayscale voltages.

11. An operational amplifier applicable to a grayscale voltage generating circuit in a display device, the operational amplifier having multiple output stages, the operational amplifier comprising:
an input stage;
an output stage selection module, comprising a plurality of signal transmitting paths; and
a first output stage and a second output stage, wherein the first output stage is configured to be coupled to drive a first load, and the second output stage is configured to be coupled to drive a second load,
wherein each of the signal transmitting paths is coupled between the input stage and a corresponding one of the output stages,
wherein one of the signal transmitting paths is conducted to couple one of the output stages to the input stage, and the rest of the signal transmitting paths are disconducted to decouple the rest of the output stages with the input stage, such that the same input stage is configured to be coupled to a different one of the output stages and only one of the loads is driven,
wherein the first load is a first gamma resistor string and the second load is a second gamma resistor string, each of the plurality of gamma resistor strings is configured to be driven by the respective output stage so as to generate a respective grayscale voltage.

12. The operational amplifier as claimed in claim 11, wherein different output stages are configured to drive different corresponding loads under control of the output stage selection module.

13. The operational amplifier as claimed in claim 11, wherein the one of the output stages coupled to the input stage is capable of driving the corresponding one of the loads.

14. The operational amplifier as claimed in claim 11, wherein when the one of the signal transmitting paths is conducted to couple the one of the output stages to the input stage, the one of the output stages provides a driving signal to one of the gamma resistor strings, such that the one of the gamma resistor strings generates a plurality of grayscale voltages.

15. A load driving apparatus applicable to a grayscale voltage generating circuit in a display device, the load driving apparatus having multiple output stages, the load driving apparatus comprising:
a load driving module, comprising an input stage and a gain stage, configured to provide a driving signal at least one node;
an output stage selection module, coupled to the load driving module to receive the driving signal; and
a first output stage a second output stage, wherein the first output stage is coupled to the output stage selection module and is configured to be coupled to drive a first load, and the second output stage is coupled to the output stage selection module and is configured to be coupled to drive a second load,
wherein the output stage selection module is configured to couple one of the output stages to the at least one node of the load driving module and decouple the rest of the output stages to the at least one node of the load driving module according to a plurality of selection signals, such that the at least one node is configured to be coupled to a different one of the output stages and only one of the loads is driven,
wherein the first load is a first gamma resistor string and the second load is a second gamma resistor string, each of the plurality of gamma resistor strings is configured to be driven by the output stage so as to generate a respective grayscale voltage.

16. The load driving apparatus as claimed in claim 15, wherein different output stages are configured to drive different corresponding loads under control of the output stage selection module.

17. The load driving apparatus as claimed in claim 15, wherein the one output stage coupled to the at least one node of the load driving module is capable of driving the corresponding one of the loads according to the driving signal.

18. The load driving apparatus as claimed in claim 15, wherein the load driving module comprises one or more stages coupled in series, configured to receive an input signal and generate the driving signal based on the input signal.

19. The load driving apparatus as claimed in claim 15, wherein the output stage selection module comprises:
a plurality of selection units, each coupled between the at least one node of the load driving module and a corresponding one of the output stages.

20. The load driving apparatus as claimed in claim 15, wherein each of the selection units is conducted or disconducted according to at least one of the selection signals.

21. The load driving apparatus as claimed in claim 15, wherein at least one of the output stages is in a push-pull configuration.

22. The load driving apparatus as claimed in claim 15, wherein at least one of the output stages is in a common source configuration.

23. The load driving apparatus as claimed in claim 15, wherein at least one of the output stages is in a common drain configuration.

24. The load driving apparatus as claimed in claim 15, wherein when the one of the signal transmitting paths is conducted to couple the one of the output stages to the input stage, the one of the output stages provides a driving signal to one of the gamma resistor strings, such that the one of the gamma resistor strings generates a plurality of grayscale voltages.

25. A load driving apparatus applicable to a grayscale voltage generating circuit in a display device, the load driving apparatus having multiple output stages, the load driving apparatus comprising:

a load driving module, comprising an input stage and a gain stage, configured to provide a driving signal at least one node;

an output stage selection module, comprising a plurality of signal transmitting paths; and a first output stage and a second output stage, wherein the first output stage is configured to be coupled to drive a first load, and the second output stage is configured to be coupled to drive a second load, wherein each of the signal transmitting paths is coupled between the at least one node of the load driving module and a corresponding one of the output stages, wherein one of the signal transmitting paths is conducted to couple one of the output stages to the at least one node of the load driving module, and the rest of the signal transmitting paths are disconducted to decouple the rest of the output stages with the at least one node of the load driving module, such that the at least one node is configured to be coupled to a different one of the output stages and only one of the loads is driven, wherein the first load is a first gamma resistor string and the second load is a second gamma resistor string, each of the plurality of gamma resistor strings is configured to be driven by the output stage so as to generate a respective grayscale voltage.

26. The load driving apparatus as claimed in claim 25, wherein different output stages are configured to drive different corresponding loads under control of the output stage selection module.

27. The load driving apparatus as claimed in claim 26, wherein the one of the output stages coupled to the at least one node of the load driving module is capable of driving the corresponding one of the loads according to the driving signal.

28. The load driving apparatus as claimed in claim 25, wherein when the one of the signal transmitting paths is conducted to couple the one of the output stages to the input stage, the one of the output stages provides a driving signal to one of the gamma resistor strings, such that the one of the gamma resistor strings generates a plurality of grayscale voltages.

29. A grayscale voltage generating circuit, comprising:
a first gamma resistor string and a second gamma resistor string, each for generating a plurality of grayscale voltages according to a plurality of driving signals; and
a plurality of load driving apparatuses, each coupled to the first gamma resistor string and the second gamma resistor string, wherein each of the load driving apparatuses comprises:
a load driving module, comprising an input stage and a gain stage, configured to provide a driving signal at least one node according to a gamma voltage;
an output stage selection module, coupled to the load driving module to receive the driving signal; and
a first output stage and a second output stage, wherein each of the output stages is coupled to the output stage selection module, the first output stage is coupled to drive the first gamma resistor string, and the second output stage is coupled to drive the second gamma resistor string, wherein the output stage selection module is configured to couple one of the output stages to the at least one node of the load driving module and decouple the rest of the output stages to the at least one node of the load driving module according to a plurality of selection signals, such that the at least one node is configured to be coupled to a different one of the output stage and only one of the gamma resistor strings is driven.

30. The load driving apparatus as claimed in claim 29, wherein one of the output stages of each of the load driving apparatuses is coupled to the at least one node of the load driving module of the load driving apparatuses, and the rest of the output stages of each of the load driving apparatuses is not coupled to the at least one node of the load driving module of the load driving apparatuses, such that one of gamma resistor strings coupled to the one output stage of each of the load driving apparatuses is configured to generate the grayscale voltages.

31. A grayscale voltage generating circuit, comprising:
a first gamma resistor string and a second gamma resistor string, each for generating a plurality of grayscale voltages according to a plurality of driving signals; and
a plurality of load driving apparatuses, each coupled to the first gamma resistor string and the second gamma resistor string, wherein each of the load driving apparatuses comprises:
a load driving module, comprising an input stage and a gain stage, configured to provide a driving signal at least one node according to a gamma voltage;
an output stage selection module, comprising a plurality of signal transmitting paths; and
a first output stage and a second output stage, wherein the first output stage is coupled to drive the first gamma resistor, and the second output stage is coupled to drive the second gamma resistor,
wherein each of the signal transmitting paths is coupled between the at least one node of the load driving module and a corresponding one of the output stages,
wherein one of the signal transmitting paths is conducted to couple one of the output stages to the at least one node of the load driving module, and the rest of the signal transmitting paths are disconducted to decouple the rest of the output stages with the at least one node of the load driving module, such that the at least one node is configured to be coupled to a different one of the output stages and only one of the gamma resistor strings is driven.

32. The load driving apparatus as claimed in claim 31, wherein one of the output stages of each of the load driving apparatuses is coupled to the at least one node of the load driving module of the load driving apparatuses, and the rest of the output stages of each of the load driving apparatuses is not coupled to the at least one node of the load driving module of the load driving apparatuses, such that one of gamma resistor strings coupled to the one output stage of each of the load driving apparatuses is configured to generate the grayscale voltages.

* * * * *